United States Patent [19]
Sharrer

[11] Patent Number: 6,015,153
[45] Date of Patent: *Jan. 18, 2000

[54] LABYRINTH SEALING DEVICE AND METHOD OF ASSEMBLY

[75] Inventor: Kenneth J. Sharrer, Waterloo, N.Y.

[73] Assignee: Garlock Inc, Palymra, N.Y.

[*] Notice: This patent is subject to a terminal disclaimer.

[21] Appl. No.: 09/304,688

[22] Filed: May 4, 1999

Related U.S. Application Data

[63] Continuation of application No. 08/869,692, Jun. 5, 1997, Pat. No. 5,908,195
[60] Provisional application No. 60/028,103, Oct. 9, 1996.

[51] Int. Cl.⁷ .................................................. F16J 15/447
[52] U.S. Cl. ...................... 277/412; 277/421; 277/348; 277/420; 277/402; 277/407
[58] Field of Search ..................... 277/417, 418, 277/419, 420, 421, 348, 402, 399, 407, 411

[56] References Cited

U.S. PATENT DOCUMENTS

| | | |
|---|---|---|
| 3,357,708 | 12/1967 | Parr . |
| 3,465,425 | 9/1969 | Leidenfrost . |
| 3,663,023 | 5/1972 | Leidenfrost . |
| 3,893,674 | 7/1975 | Paradine . |
| 4,153,258 | 5/1979 | Huber et al. . |
| 4,290,610 | 9/1981 | Lizogub et al. . |
| 4,451,046 | 5/1984 | Bliven . |
| 4,466,620 | 8/1984 | Orlowski . |
| 4,572,517 | 2/1986 | Rockwood et al. . |
| 4,743,034 | 5/1988 | Kakabaker et al. . |
| 4,890,941 | 1/1990 | Calafell, II et al. . |
| 5,024,451 | 6/1991 | Borowski ................................ 277/412 |
| 5,028,054 | 7/1991 | Peach . |
| 5,244,216 | 9/1993 | Rhode . |
| 5,316,317 | 5/1994 | Fedorovich et al. ................ 277/411 X |
| 5,431,414 | 7/1995 | Federovich et al. . |
| 5,480,161 | 1/1996 | Borowski . |
| 5,498,006 | 3/1996 | Orlowski . |
| 5,522,601 | 6/1996 | Murphy .............................. 277/421 X |
| 5,908,195 | 6/1999 | Sharrer ............................... 277/421 X |

FOREIGN PATENT DOCUMENTS

| | | |
|---|---|---|
| 0027539 | 4/1981 | European Pat. Off. . |
| 2219475 | 12/1989 | United Kingdom . |

Primary Examiner—Lynne H. Browne
Assistant Examiner—David E. Bochna
Attorney, Agent, or Firm—Cummings & Lockwood

[57] ABSTRACT

A dynamic labyrinth sealing device which includes a stator having an annular engagement flange on a radially inner portion thereof and a rotator having an annular engagement flange on a radially outer portion thereof. The stator annular engagement flange and the rotator annular engagement flange have coacting radially extending openings for mechanically interlocking the stator and the rotator.

3 Claims, 9 Drawing Sheets

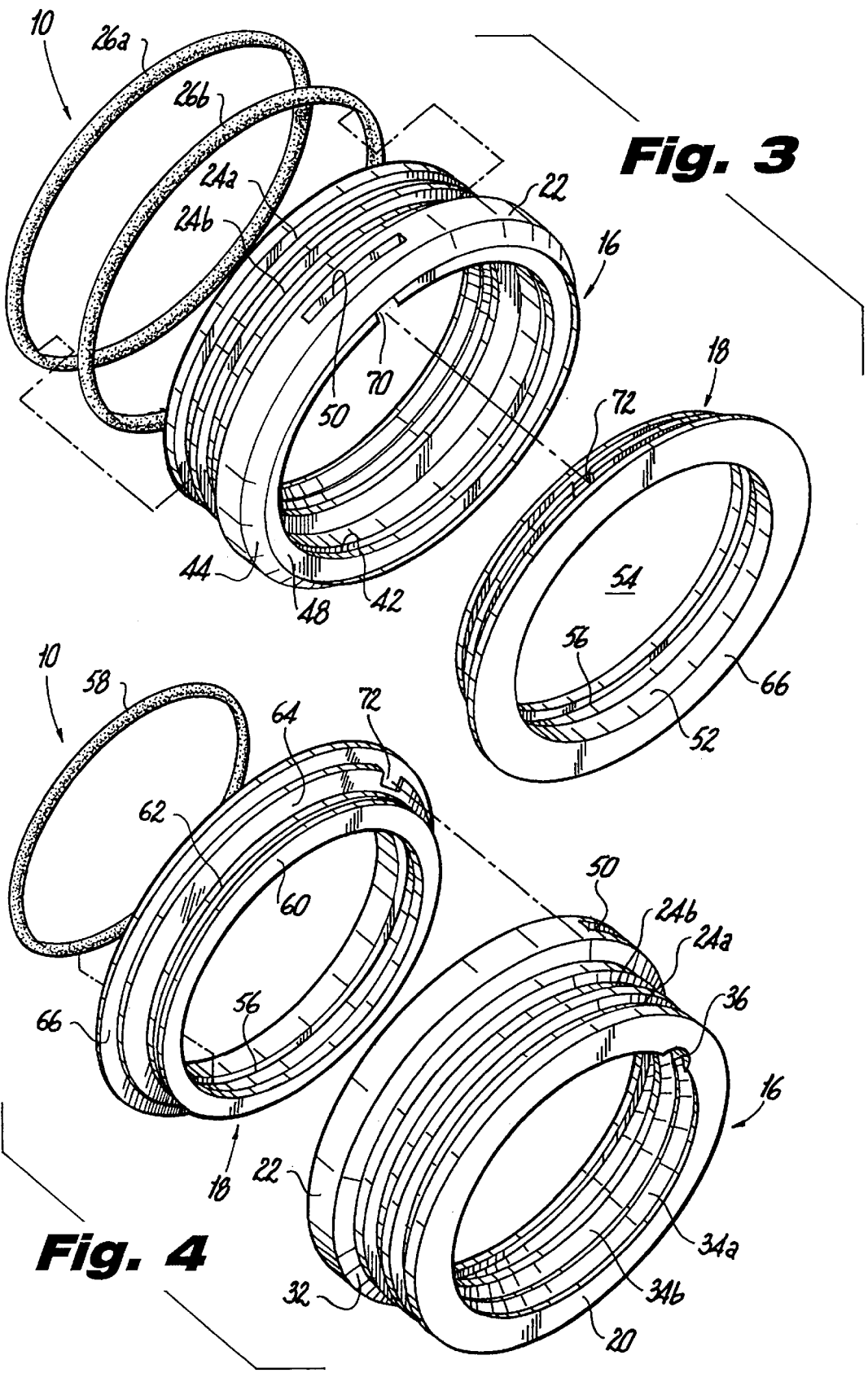

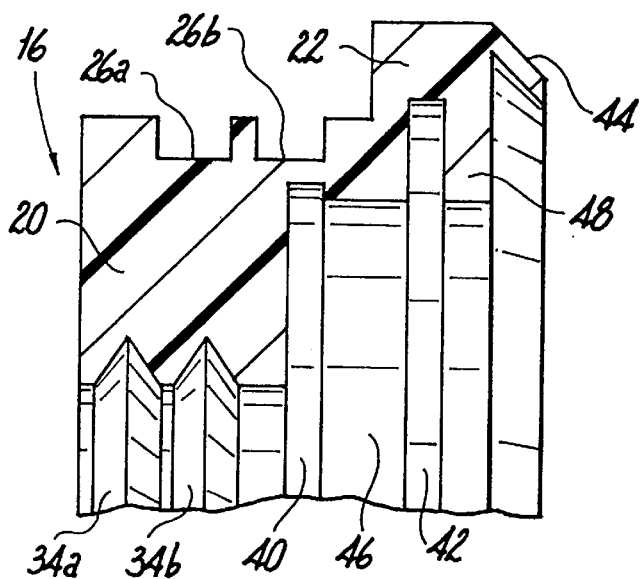
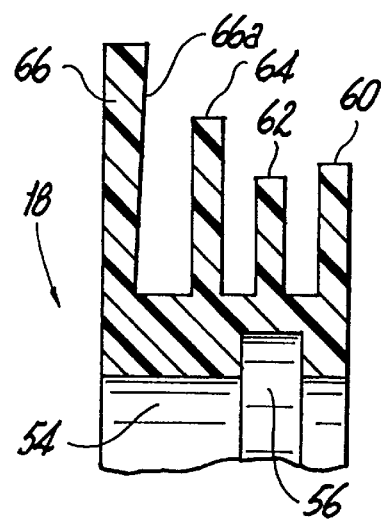
Fig. 11
Fig. 12
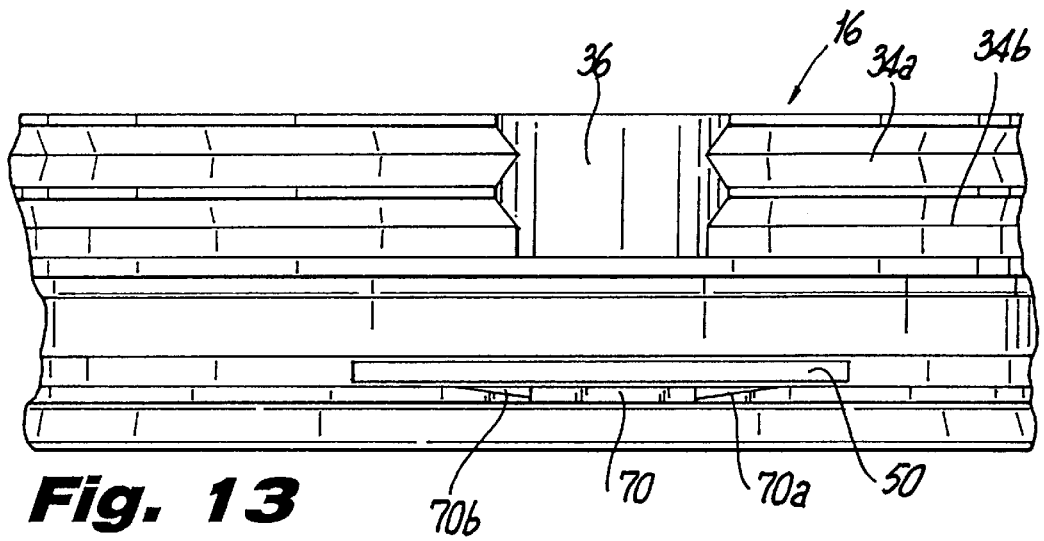
Fig. 13
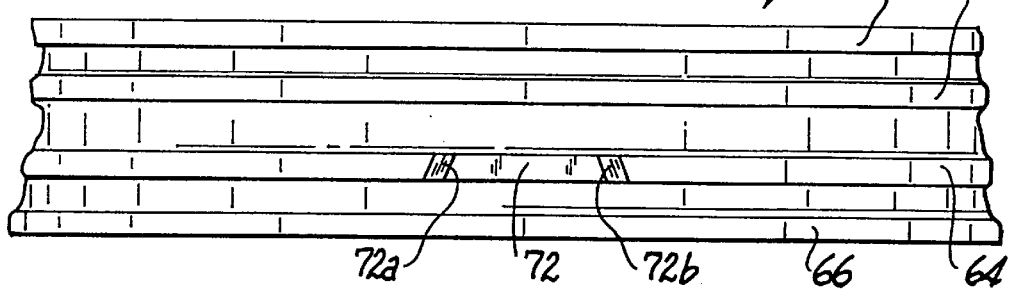
Fig. 14

LABYRINTH SEALING DEVICE AND METHOD OF ASSEMBLY

CROSS-REFERENCE TO RELATED APPLICATIONS

This application is a continuation of U.S. application Ser. No., 08/869,692 fled Jun. 5, 1997, which is now U.S. Pat. No. 5,908,195, which claims priority to U.S. Provisional Application Ser. No. 60/028,103 filed Oct. 9, 1996.

BACKGROUND OF THE INVENTION

1. Field of the Invention

The subject invention is related to mechanical joint packing devices, and more particularly, to a labyrinth sealing device for providing a dynamic seal between a rotating shaft and a bearing housing, and a method of assembling the sealing device.

2. Background of the Related Art

Labyrinth type rotary shaft seals are well known in the art. Typically, these devices include two concentric ring structures which define a rotator and a stator. The rotator is sealing engaged with a rotating shaft, and the stator is sealingly engaged with a bearing housing. Specifically contoured pathways or grooves are formed in the interior surfaces of the seal rings to create a maze or labyrinth extending between the exterior of the bearing housing to the interior of the bearing housing. The labyrinth pathway serves as a hydrodynamic barrier to maintain fluid lubricants within the bearing housing and prevent contaminants from entering the bearing housing. The more elaborate the pathway, the less chance there is that contaminating materials will pass through the structure and into the bearing housing. One way of making a more elaborate pathway is to increase the amount of surface area that must be traversed by contaminating materials, i.e., increase the length of the pathway.

In general, the extent of the surface area of the labyrinth pathway will be limited by the degree of mechanical interlock between the two components of the device upon assembly. If the interlocking contact area between the components is relatively small, there will be less surface area to form a labyrinth pathway therebetween. Conversely, if the interlocking contact area between the two components is relatively large, there will be a greater surface area to form a more elaborate labyrinth pathway between the two components.

An example of a prior art labyrinth sealing device in which there is a low degree of mechanical interlock between the rotator and the stator is disclosed in U.S. Pat. No. 4,466,620 to Orlowski. In the Orlowski device, the rotator is provided with an axially extending annular flange for engaging a complementary axially extending annular recess formed in the stator. An example of a prior art labyrinth sealing device in which there is a high degree of mechanical interlock between the rotator and the stator is disclosed in U.S. Pat. Nos. 5,316,317 and 5,431,414 to Fedorovich et al. This is mechanical interlock is achieved during assembly by initially heating the connective portion of a the stator to expand the diameter thereof. The connective portion of the rotator is then positioned radially inside of the connective portion of the stator. The stator is then permitted to cool to effect the interlock between the two components.

Although the Fedorovich et al. device provides an elaborate labyrinth pathway to prevent contaminants from passing through the structure, its method of assembly is both time consuming and inefficient. Accordingly, there exists a need in the art to provide a labyrinth type rotary shaft seal in which there is a high degree of mechanical interlock between the component parts thereof that can be assembled quickly and efficiently.

SUMMARY OF THE INVENTION

The subject invention is directed to a dynamic labyrinth sealing device for placement between a rotating shaft and a bearing housing. The device includes a stator for sealingly engaging the bearing housing and a rotator for sealing engaging the rotating shaft. An elaborate labyrinth pathway is defined between the stator and rotator for preventing contaminants from passing through the structure. The stator has an annular engagement flange on a radially inner portion thereof and the rotator has an annular engagement flange on a radially outer portion thereof. In accordance with a preferred embodiment of the subject invention, the stator annular engagement flange and the rotator annular engagement flange have coacting means for mechanically interlocking the stator and the rotator. Once interlocked, the annular engagement flanges form part of the labyrinth pathway.

Preferably, the coacting means includes an outer radial engagement notch formed in the stator engagement flange and an inner radial engagement notch formed in the rotator engagement flange. The outer radial engagement notch and the inner radial engagement notch include complementary angled engagement surfaces. The stator engagement flange and the rotator engagement flange each have opposed leading and trailing axial surfaces, and the complementary angled surfaces of the radial engagement notches are dimensioned and configured to facilitate progressive opposed lateral deflection of the engagement flanges and effectuate juxtaposition of the leading axial surface of the rotator engagement flange and the trailing axial surface of the stator engagement flange.

In accordance with the subject invention, at least one annular recess is formed in a radially outer portion of the stator for supporting an elastomeric O-ring between the stator and the bearing housing. Similarly, at least one annular recess is formed in a radially inner portion of the rotator for supporting an elastomeric O-ring between the rotator and the rotating shaft. In addition, at least one annular groove is formed in the radially inner portion of the stator, in a location spaced from the engagement flange thereof, for receiving lubricating fluid from the bearing housing, and an axial drainage port is associated with the annular groove.

At least one annular groove is formed in the radially outer portion of the rotator, in a location spaced from the engagement flange thereof, for capturing contaminants drawn into the sealing device from outside the bearing housing. A radial exhaust slot is preferably formed in the stator to facilitate the expulsion of captured contaminants from the sealing device. An annular sealing lip projects from a leading edge of the radially outer portion of the stator for sealingly engaging a leading edge of the radially outer portion of the rotator, providing an additional barrier to contaminants.

To assemble the sealing device of the subject invention, the stator and rotator must be properly oriented with respect to one another placing the angled engagement surfaces of the radial engagement notches into abutting contact. Then, the rotator and the stator are rotated relative to one another so that the engagement flanges undergo progressive lateral deflection and the leading surface of the rotator engagement flange is moved into juxtaposition with the trailing surface of the stator engagement flange, thereby mechanically interlocking the stator and rotator.

These and other features of the dynamic labyrinth sealing device of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to make and use the labyrinth sealing device of the subject invention, preferred embodiments of the sealing device will be described in detail hereinbelow with reference to the drawings wherein:

FIG. 3 is an exploded perspective view of the labyrinth sealing device of the subject invention as viewed from the leading end of the device;

FIG. 4 is an exploded perspective view of the labyrinth sealing device of the subject invention as viewed from the trailing end of the device;

FIG. 11 is an enlarged cross-sectional view taken along line 11—11 of FIG. 7 illustrating the detailed construction of the stator member;

FIG. 12 is an enlarged cross-sectional view taken along line 12—12 of FIG. 10 illustrating the detailed construction of the rotator member;

FIG. 13 is an enlarged plan view of the stator taken along line 13—13 of FIG. 5 illustrating a radially inner portion of the stator at a bottom center location thereon;

FIG. 14 is an enlarged plan view of the rotator taken along line 14—14 of FIG. 8 illustrating a radially outer portion of the rotator at a bottom center location thereon;

FIGS. 15–21 illustrate in sequential order a method of assembling the labyrinth sealing device of the subject invention wherein:

FIG. 15 is a perspective view illustrating the manner in which the rotator and stator are initially oriented relative to one another prior to assembly;

FIG. 16 is an elevational view illustrating the initial orientation of the engagement notches relative to one another so that the complementary angled engagement surfaces there of are in abutting contact;

FIG. 17 is a cross-sectional view taken along line 17—17 of FIG. 16 illustrating the relative positions of the complementary angled engagement surfaces;

FIG. 18 is perspective view illustrating the progressive opposed lateral deflection of the engagement flanges of the stator and rotator as the rotator is rotated relative to the stator during the assembly of the labyrinth sealing device;

FIG. 19 is a cross-sectional view taken along line 19—19 of FIG. 18 illustrating the progressive movement of the leading axial surface of the rotator engagement flange into juxtaposition with trailing axial surface of the stator engagement flange during assembly of the labyrinth sealing device;

FIG. 20 is a cross-section view of the labyrinth sealing device of the subject invention illustrating the manner by which the radial sealing lip formed on the leading edge portion of the stator flexes outwardly to sealing engage the leading edge portion of the rotator during assembly; and FIG. 21 provides a schematic illustration of the direction of relative rotation of the rotator d stator during assembly of the labyrinth sealing device of the subject invention.

DETAILED DESCRIPTION OF THE PREFERRED EMBODIMENTS

Figure 1:
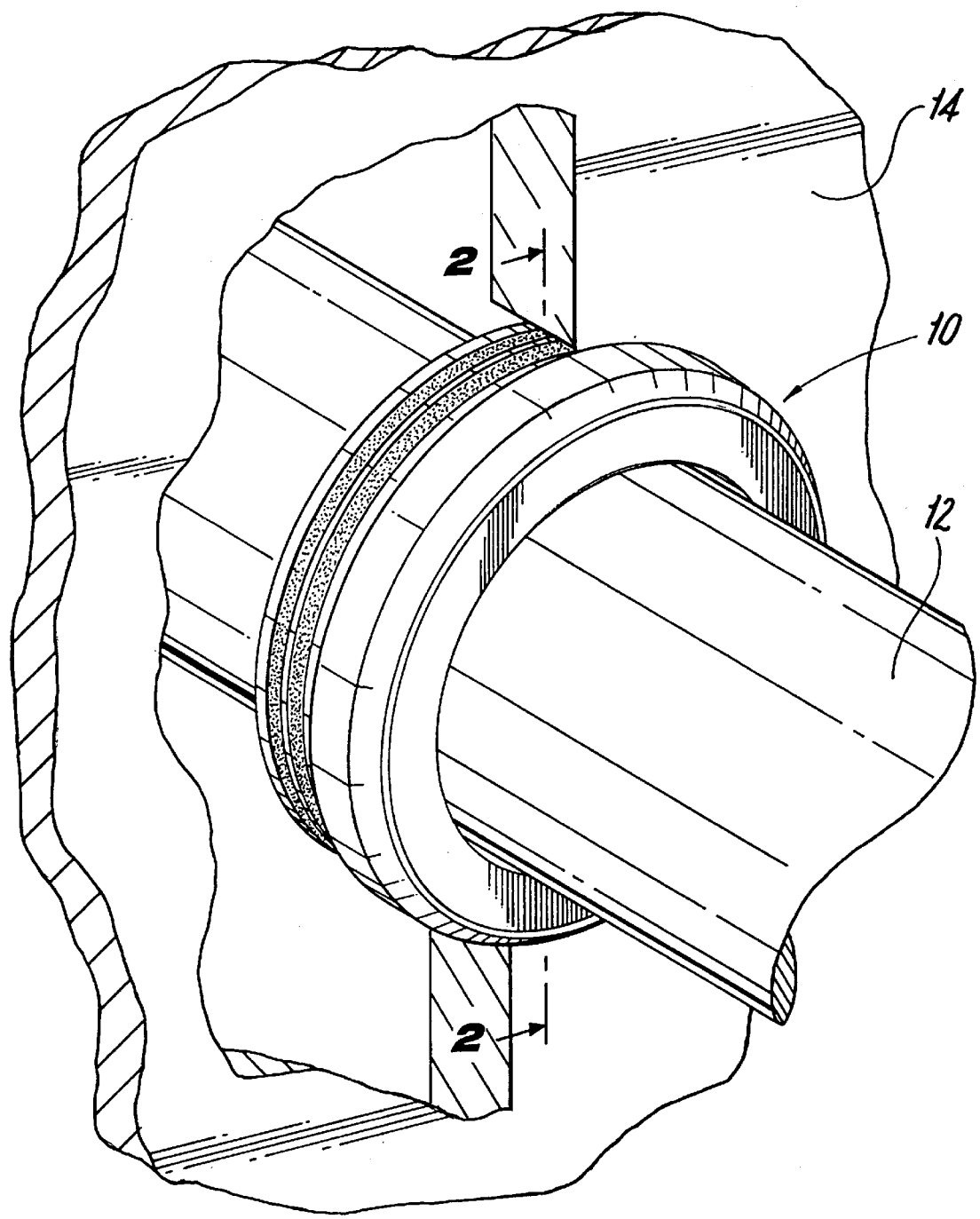
FIG. 1 is a perspective view of a labyrinth sealing device constructed in accordance with a preferred embodiment of the subject invention and installed between a rotating shaft and a bearing housing.

Referring now in detail to the drawings wherein like reference numerals identify similar structural elements of the subject invention, there is illustrated in FIG. I a dynamic sealing device constructed in accordance with a preferred embodiment of the subject invention and designated generally by reference numeral 10. Referring to FIG. 1, sealing device 10 is employed between a rotating axial shaft 12 and a bearing housing 14 containing a fluid lubricant to prevent leakage of lubricants from the housing and entry of contaminants into the housing. More particularly, the device is designed as a two-piece labyrinth seal which operates to prevent the migration of the lubricants and/or the contaminants in either direction. The device is preferably formed from polytetrafluoroethylene (PTFE) although alternative self-lubricating materials of construction may also be employed. The selected material of construction must however, exhibit memory retention after elastic deformation.

In the detailed description which follows, the term "inboard" shall refer to the side of sealing device 10 or component part thereof that is closest to the interior of bearing housing 14, while the term "outboard" shall refer to the side of sealing device 10 or component part thereof that is closest to the exterior of bearing housing 14. Additionally, the terms "trailing" and "leading," when used to describe the relative positions of certain component parts of the sealing device 10, shall have the same or substantially the same meaning as the terms "inboard" and "outboard," respectively.

Figure 2:
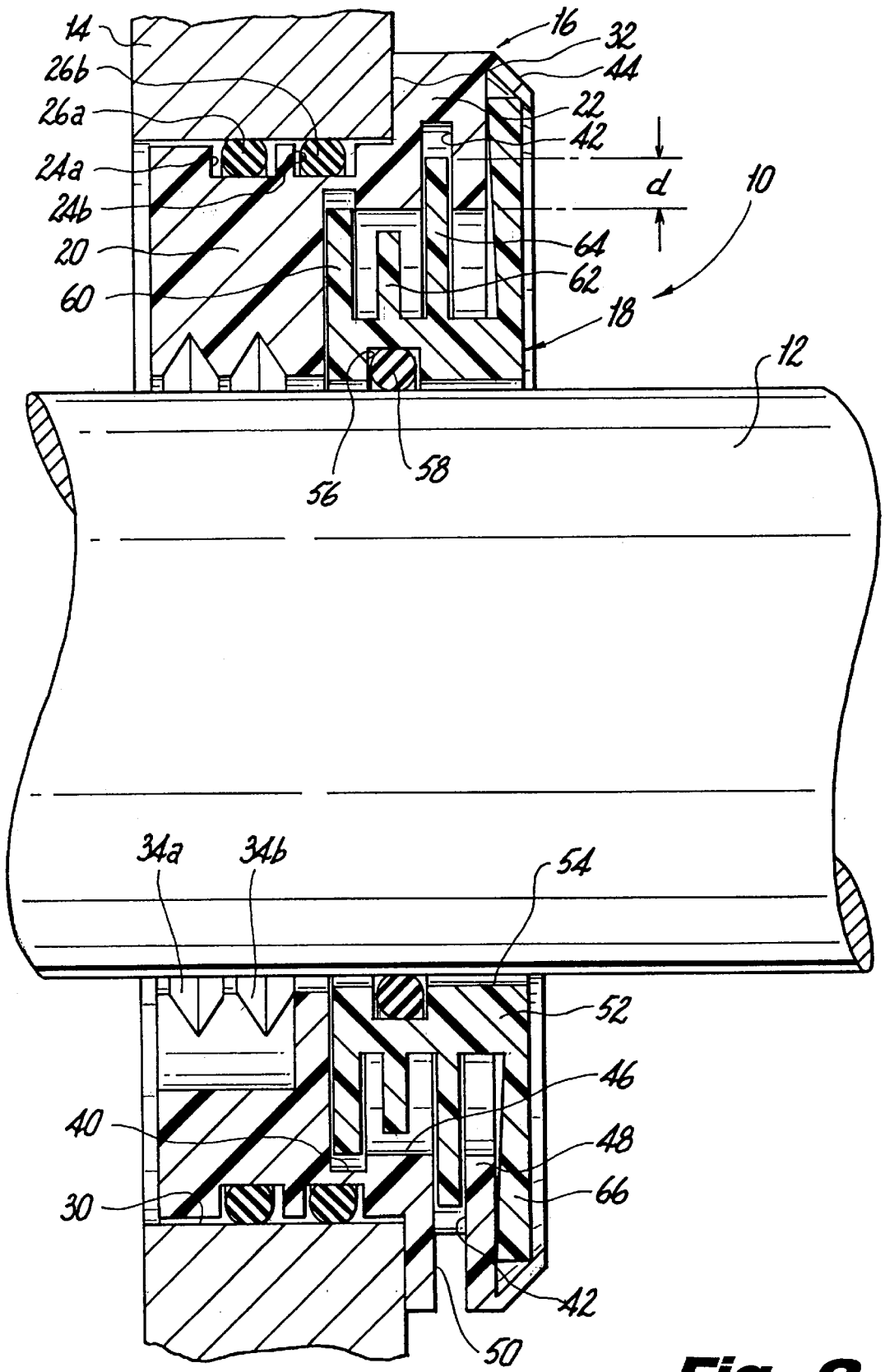
FIG. 2 is a cross-sectional view of the labyrinth sealing device of the subject invention taken along line 2—2 of FIG. 1.

Referring to FIGS. 2–4, sealing device 10 includes an annular stator 16 for sealingly engaging bearing housing 14 and an annular rotator 18 for sealingly engaging the axial shaft 12. The annular stator 16 is defined by an annular main body portion 20 and a forwardly extending annular cover portion 22 which are integrally formed with one another as a monolithic unit. As shown in FIG. 2, the main body portion 20 includes a pair of annular slots 24a and 24b in a radially outer surface thereof for accommodating a pair of elastomeric sealing rings 26a and 26b designed to compressibly engage the inner periphery of the shaft bore 30 that extends through the wall of bearing housing 14 to secure stator 16 from rotation relative to the rotator 18. The annular cover portion 22 has a larger outer diameter that the main body portion 20 and the shaft bore 30 and resides outside of the bearing housing 14 with the shoulder surface 32 thereof abutting the exterior surface of the housing when installed.

Figure 7:
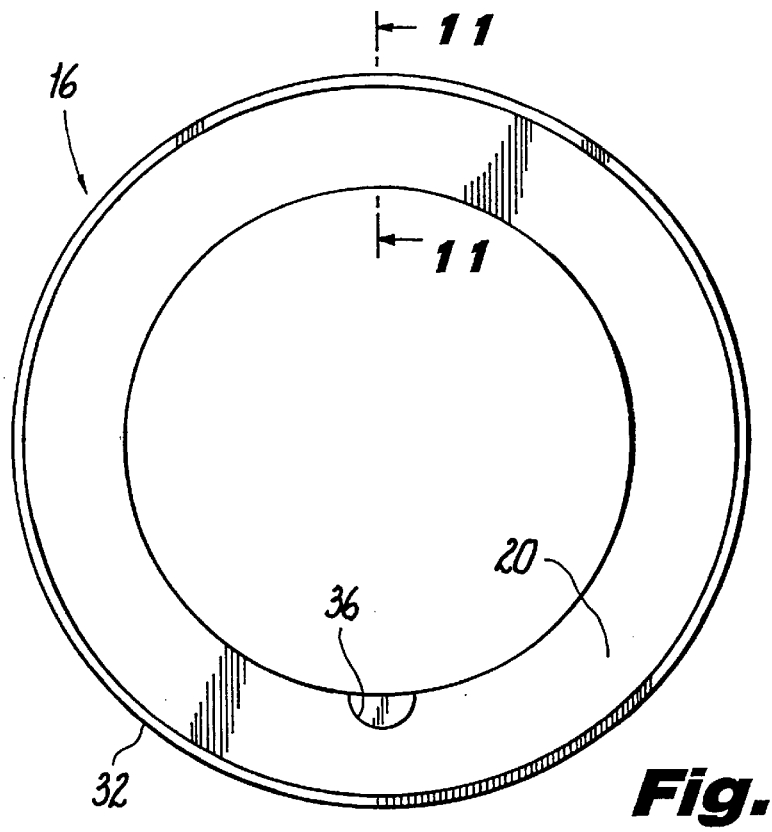
FIG. 7 is a rear elevational view of the stator member of the labyrinth sealing device of the subject invention.

With continuing reference to FIG. 2, a pair of annular lubricant grooves 34a and 34b are defined in the radially inner surface of main body portion 20 for scavenging liquid lubricants that adhere to the rotating shaft during operation. As best seen in FIGS. 4, 7 and 13, an axially opening recess 36 is if formed in the main body portion 20, which serves as a drain for the scavenged lubricants accumulated in grooves 34a and 34b. When sealing device 10 is installed, recess 36 is preferably positioned at a dead bottom center location with respect to the longitudinal axis of rotating shaft 12.

As best seen in FIG. 2, the cover portion 22 of stator 16 is dimensioned and configured to completely enclose and fully circumscribe annular rotator 18. The radially inner surface of cover portion 22 forms a stepped annular engagement area which defines an elaborate labyrinthine pathway designed to prevent the ingress of contaminants from the atmosphere into the bearing housing 14, and provides the structural interface to rotatably engage rotator 18.

Referring to FIG. 11, the stepped engagement area of stator 16 is defined by an inboard engagement channel 40, an outboard engagement channel 42, and a radial engagement lip 44. An annular land surface 46 is formed between engagement channels 40 and 42, and an annular engagement flange 48 is formed between the outboard engagement channel 42 and the radial engagement lip 44. As illustrated in FIG. 11 as well as FIG. 2, outboard engagement channel 42 has a greater radial depth than inboard engagement channel 40. As will be discussed in greater detail hereinbelow, each of these structures accommodates a complementary structure formed in the radially outer surface of rotator 18.

As best seen in FIGS. 2 and 3, a radially outwardly extending exhaust slot 50 extends from outboard engagement channel 42, through the annular cover portion 22 of stator 16, to the atmosphere, for discharging contaminants that may enter into the labyrinthine pathway created between the engagement surfaces of the stator and rotator. When the sealing device 10 is installed, exhaust slot 50 is preferably positioned at a dead bottom center location with respect to the longitudinal axis of rotating shaft 12.

With continuing reference to FIGS. 2–4, rotator 18 is defined by an annular body portion 52 having an interior bore 54 dimensioned to accommodate axial shaft 12. An annular retention slot 56 is defined in the radially inner surface of body portion 42 to accommodate an elastomeric sealing ring 58 dimensioned to sealingly engage the outer periphery of axial shaft 12 and facilitate the movement of rotator 18 therewith, relative to stator 16 and bearing housing 14.

Figure 9:
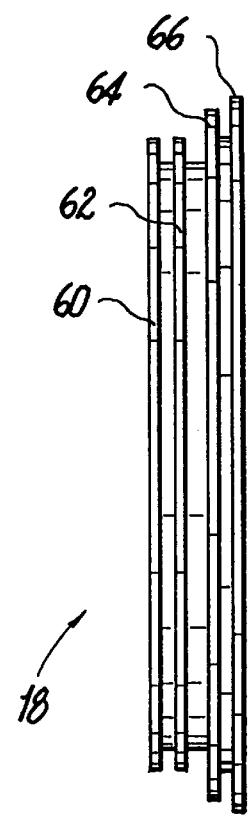
FIG. 9 is a side elevational view of the rotator member of the labyrinth sealing device of the subject invention.

As illustrated in FIGS. 9 and 12, a series of radially outwardly projecting flanges of varying radially dimension extend from the annular body portion 52 of rotator 18 to further define the labyrinth pathway of sealing device 10. These include a first inboard engagement flange 60 dimensioned and configured to interact with inboard engagement channel 40, an intermediate barrier flange 62 positioned in opposition to annular land surface 46, an outboard engagement flange 64 dimensioned and configured to interact with outboard engagement channel 42. Inboard engagement flange 60 has a greater radial height than intermediate barrier flange 62, while outboard engagement flange 64 has a greater radial height than both the inboard and intermediate flanges 60 and 62.

Figure 8:
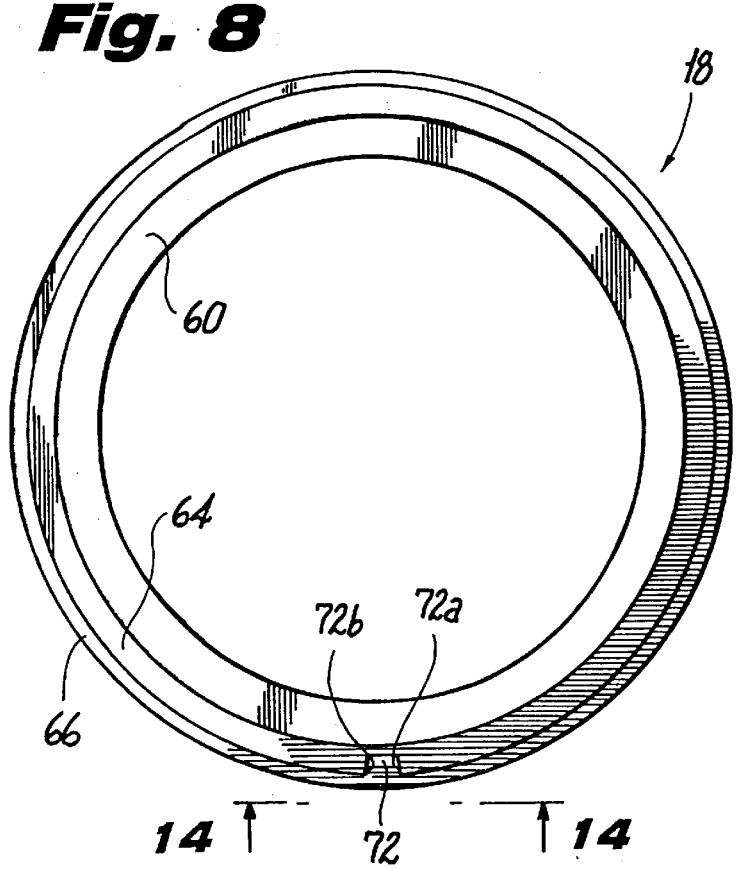
FIG. 8 is a rear elevational view of the rotator member of the labyrinth the sealing device of the subject invention.
Figure 10:
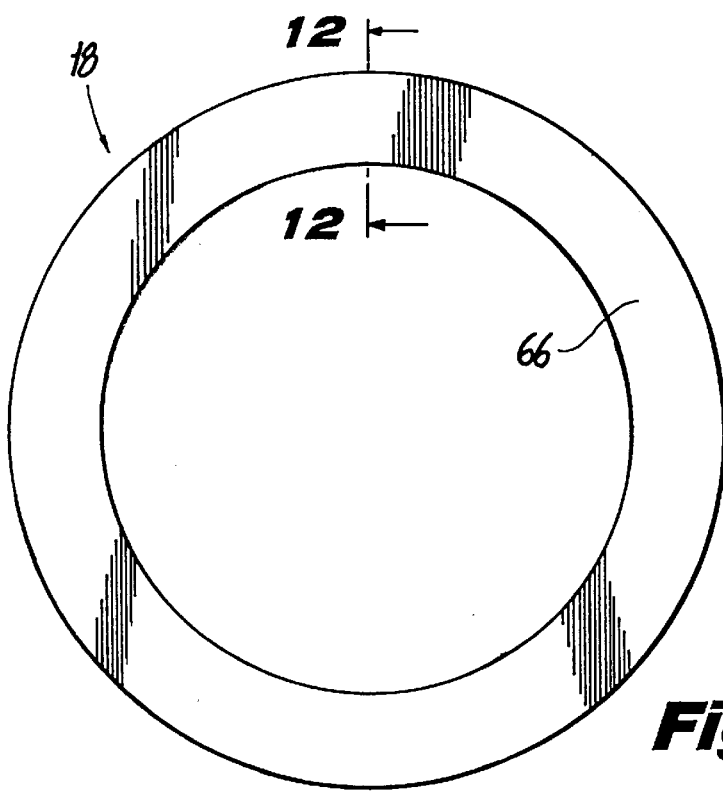
FIG. 10 is a front elevational view of the rotator member of the labyrinth sealing device of the subject invention.
Figure 20:
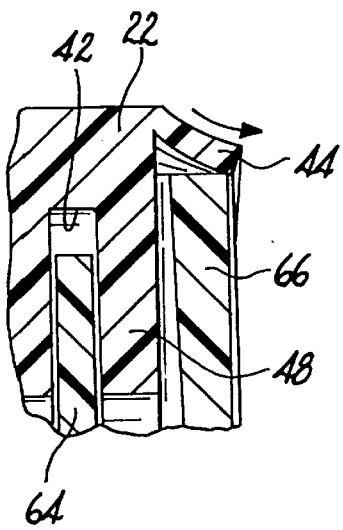

Referring once again to FIG. 2 in conjunction with FIGS. 8–10, rotator 18 also includes a outboard face plate 66 which, when engaged by radial engagement lip 44, encloses the labyrinth pathway defined between stator 16 and rotator 18, and which, together with engagement lip 44, form the primary barrier to contaminates entering bearing housing 14. As best seen in FIG. 20, engagement lip 44 is flexible with respect to outer periphery of cover portion 22, thus during assembly, lip 44 deflects radially outwardly to receive and sealingly engage outboard face plate 66. In a preferred embodiment of the subject invention, enhanced sealing effects may also provided by the inherent angularity of the inboard side 66a of face plate 66 (FIG. 12), which, due to its configuration, tends to lean against the outboard side of the annular engagement flange 48 of stator 16, forming an added barrier to contaminants.

As best seen in FIG. 2, there is a high degree of mechanical interlock between the outboard engagement flange 64 of rotator 18 and the outboard engagement channel 42 of stator 16, as shown by radial dimension "d". The high degree of mechanical interlock provided by this structural interaction is substantially greater than that provided by prior art labyrinth sealing devices. This interlocking prevents the two seal components from disengaging from one another during operation and provides a superior sealing structure as compared to prior art devices.

Figure 5:
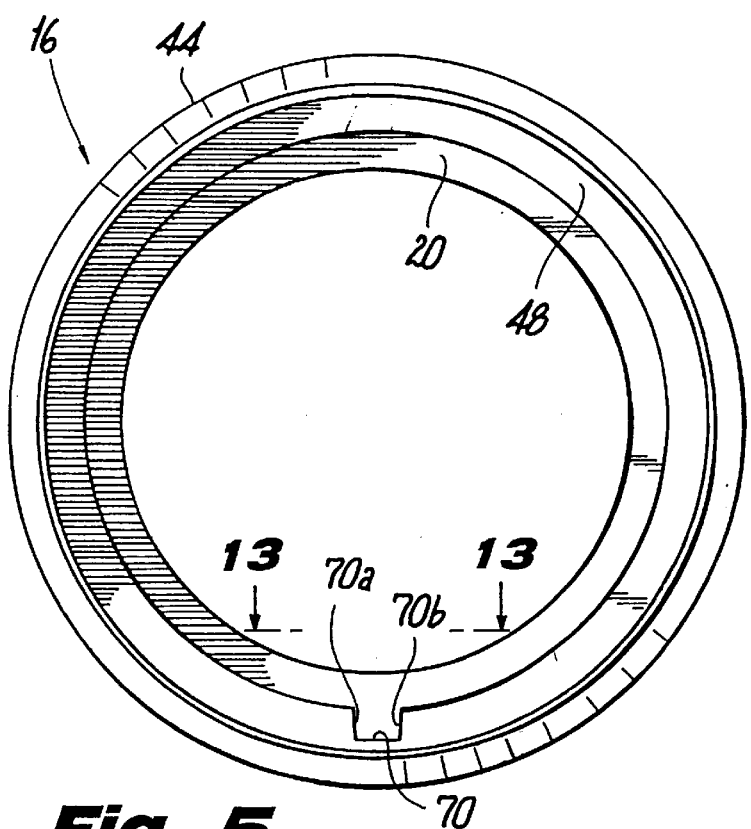
FIG. 5 is front elevational view of the stator member of the labyrinth the sealing device of the subject invention.
Figure 6:
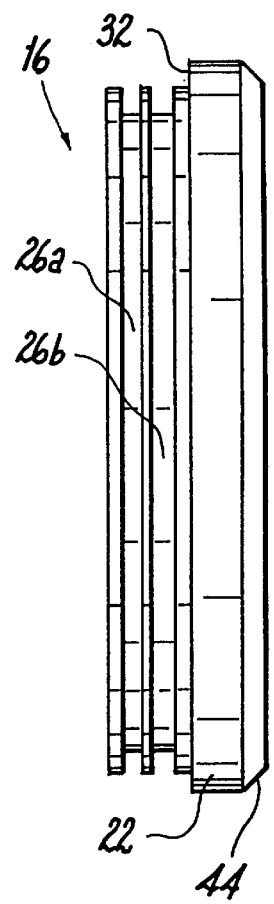
FIG. 6 is a side elevational view of the stator member of the labyrinth sealing device of the subject invention.

In order to achieve the high degree of mechanical interlock that exists between the stator 16 and rotator 18 of sealing device 10, the two components are provided with a unique engagement mechanism that incorporates a pair of coacting complementary engagement notches defined in stator engagement flange 48 and rotator engagement flange 64 that facilitate the manual assembly of sealing device 10. More particularly, as illustrated in FIGS. 5 and 8 respectively, a radially outwardly extending engagement notch 70 is formed in stator engagement flange 48, and a radially inwardly extending engagement notch 72 is formed in rotator engagement flange 64. Stator engagement notch 70 is formed with opposed angled engagement surfaces 70a and 70b, best seen in FIG. 13, and rotator engagement notch 72 is formed with opposed angled engagement notches 72a and 72b, best seen in FIG. 14. As will be discussed in greater detail hereinbelow, the coacting complementary angled engagement surfaces of notches 70 and 72 serve to initiate the mechanical assembly of sealing device 10.

Figure 15:
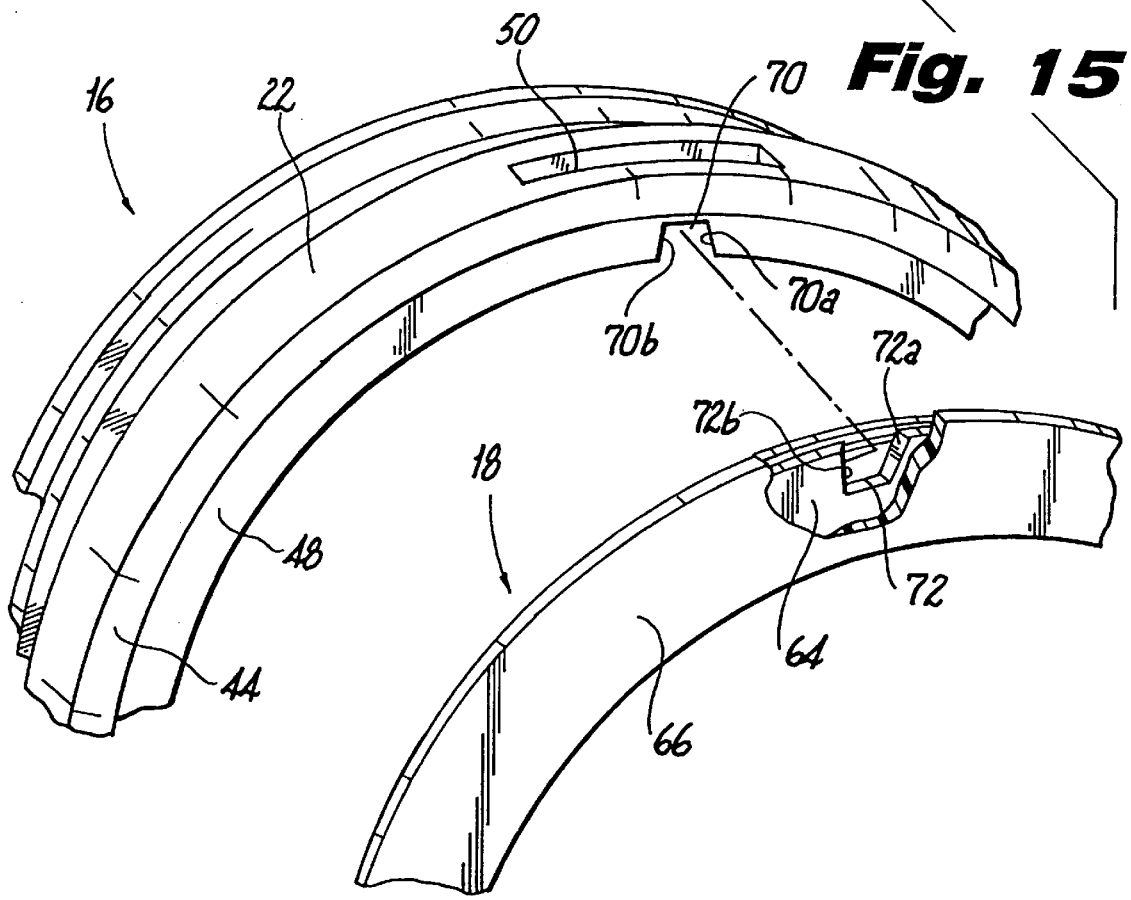

It is envisioned and well within the scope of this invention that the engagement notches could vary in size and configuration, ranging from the rather large wedge-shaped notches depicted in FIG. 15 to much smaller slots or even thin slits which would also effectively facilitate assembly of the device. Accordingly, the mechanism for mechanically interlocking the stator and rotator should not be limited to the embodiment specifically illustrated herein.

Figure 16:
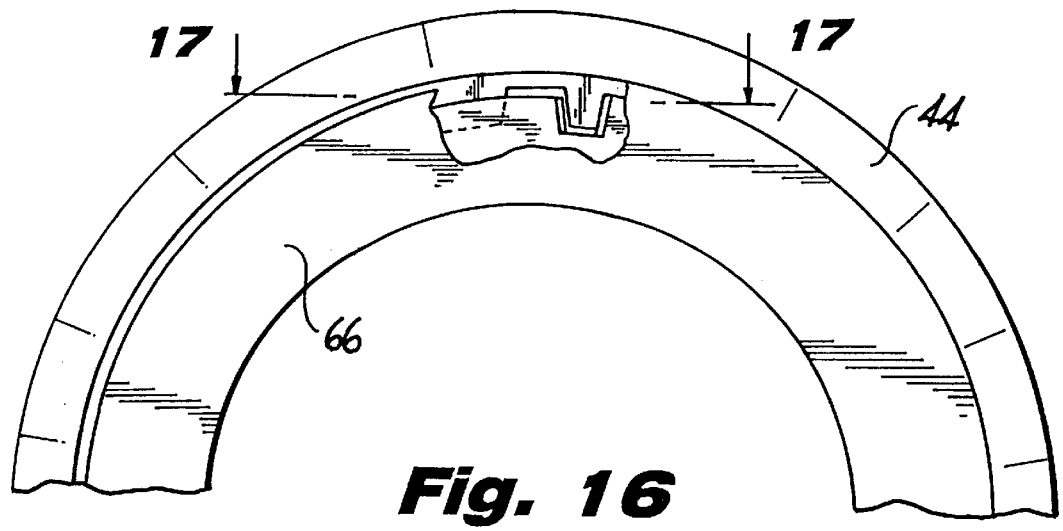
Figure 17:
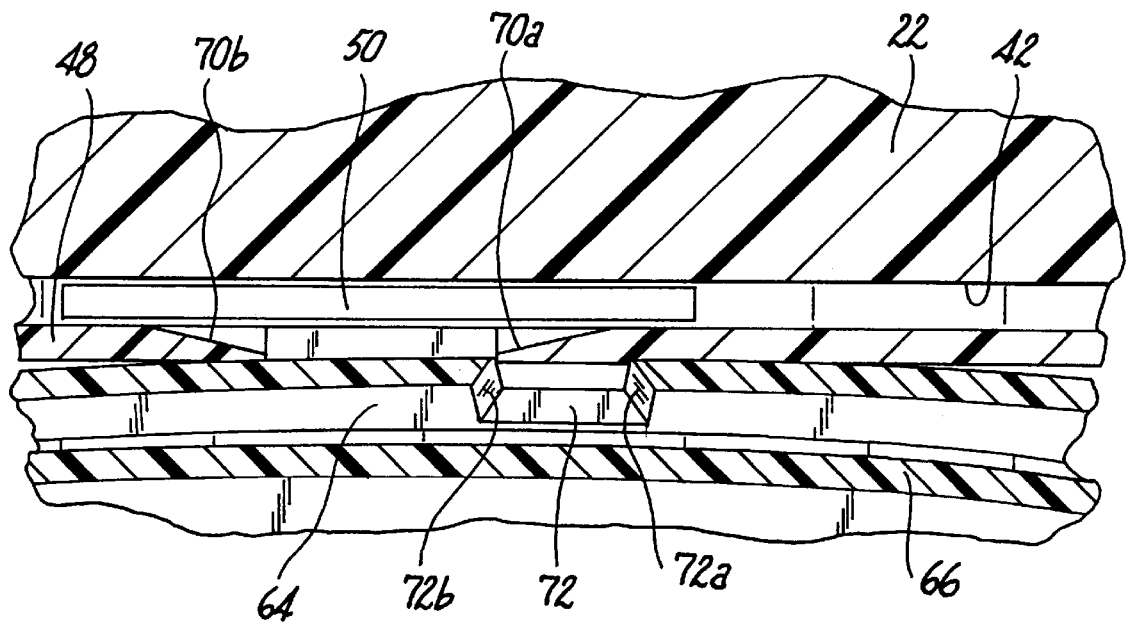

Referring now to FIGS. 15–19, there is illustrated in sequential order, the method by which stator 16 and rotator 18 are assembled through the mechanical interaction of engagement notches 70 and 72. As illustrated in FIG. 15, to promote assembly, stator 16 and rotator 18 are initially oriented relative to one another such that the stator engagement notch 70 is axially aligned with the rotator engagement notch 72. Thereupon, the two components are moved into juxtaposition, and complementary angled engagement surfaces 70a and 72b of engagement notches 70 and 72, respectively, are moved into abutting relationship with one another, as illustrated in FIGS. 16 and 17. It will be readily appreciated by those skilled in the art that the two components of sealing device 10 could also be oriented such that complementary engagement surfaces 70b and 72a are moved into abutting relationship to initiate assembly rather than surfaces 70a and 72b.

Figure 18:
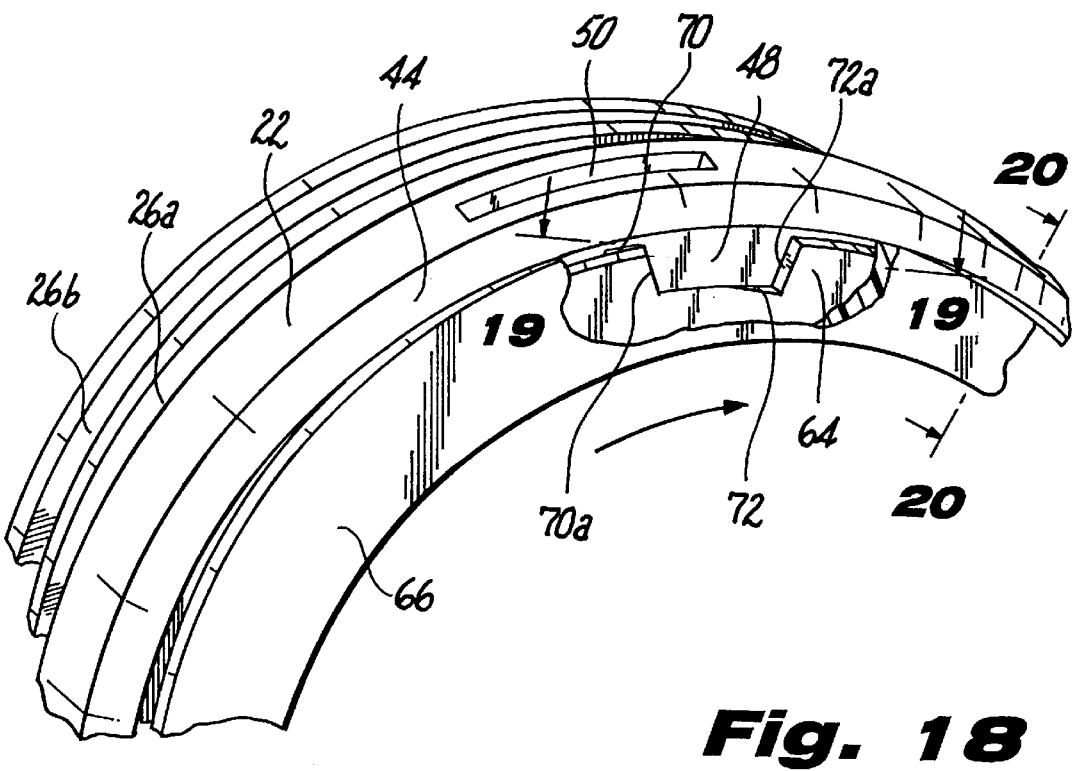
Figure 19:
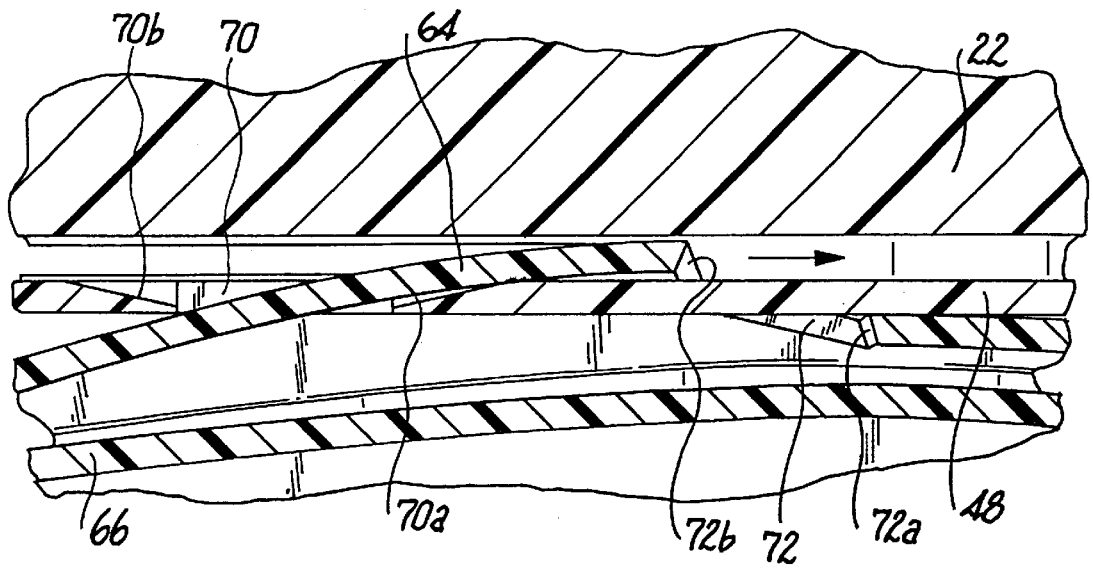

As shown in FIG. 18, assembly of the sealing device 10 is effectuated by rotating the two components relative to one another, in the illustrated instance by moving the rotator relative to the stator in a clockwise direction. At the onset of this clockwise past one another so that they operate as opposed camming surfaces or ramps, causing the progressive opposed lateral deflection of stator engagement flange 48 and rotator engagement flange 64, as best seen in FIG. 19. As a result, the leading surface (outboard side) of rotator engagement flange 64 is progressively moved into juxtaposition with the trailing surface (inboard side) of stator engagement flange 48. In essence, through clockwise relative rotation of the stator and rotator, rotator engagement flange 64 is progressively received in outboard engagement channel 42 of stator 16. Concomitantly, the annular face plate 66 of rotator 18 is progressively received by engagement lip 44 as it deflects angularly away from the cover portion 22 of stator 16, as shown in FIG. 20.

Since it is necessary for the engagement structures of the stator and rotator to deflect from their normal orientation during assembly, as shown for example in FIGS. 19 and 20, it is essential that the thermoplastic material from which the components of sealing device 10 is constructed exhibit shape memory retention. As noted hereinabove, the preferred material of construction is PTFE.

Figure 21:
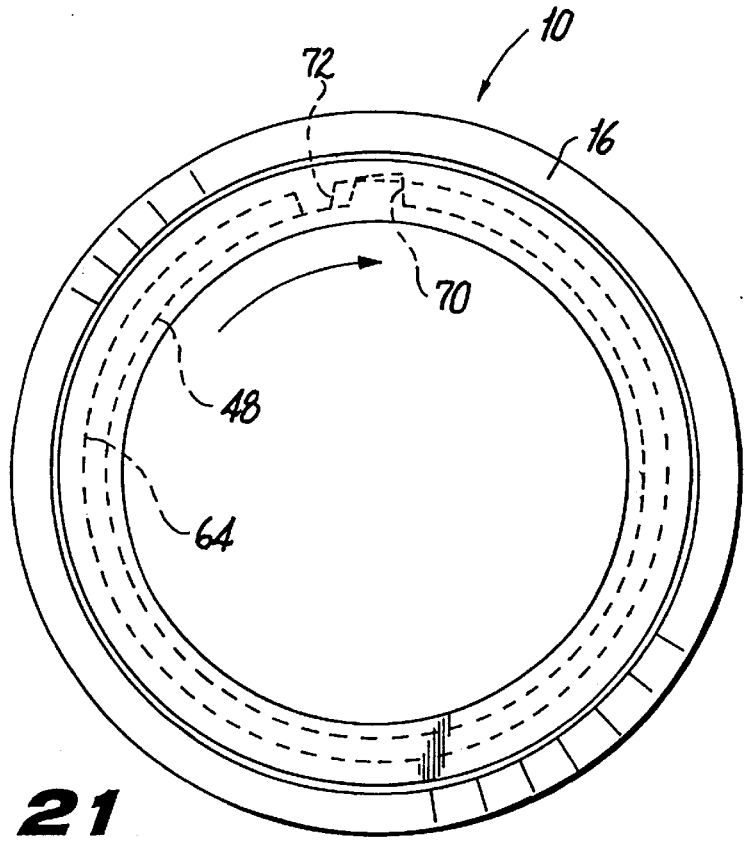

As illustrated in FIG. 21, clockwise relative rotation of rotator 18 relative to stator 16 continues through 360° until such time as the entirety of rotator engagement flange 64 is received within the outboard engagement channel 42 of the stator 16 whereby the outboard side (leading surface) of the rotator engagement flange 64 is in axial juxtaposition with the inboard side (trailing surface) of the stator engagement flange 48. At such a time, the memory retention characteristics of the material from which the stator and rotator are constructed will serve to reconfigure the manually deflected engagement structures of the stator and rotator. Furthermore, once assembled, rotator 18 is fully enclosed by the annular cover portion 22 of stator 16, and sealing device 10 is in an assembled condition ready for employment between axial shaft 12 and bearing housing 14.

Although the labyrinth sealing device of the subject invention has been described with respect to a preferred embodiment, it is apparent that modifications and changes can be made thereto without departing from the spirit and scope of the invention as defined by the appended claims.

What is claimed is:

1. A dynamic sealing device for placement between a rotating shaft and a bearing housing comprising:
   a) an annular stator having a body portion and a cover portion, said cover portion having a radially inner engagement portion associated therewith; and
   b) an annular rotator having a radially outer engagement portion surrounded by said cover portion and operatively connected with said radially inner engagement portion of said stator, said stator having a radial sealing lip protecting from a radially outer leading edge of said cover portion for sealingly engaging a leading edge portion of said rotator, said sealing lip being relatively flexible with respect to said cover portion, wherein said sealing lip is adapted and configured to deflect radially outwardly to receive and engage said leading edge portion of said rotator during assembly.

2. A dynamic sealing device as recited in claim 1, wherein said leading edge portion of said rotator is defined by an outboard face plate.

3. A dynamic sealing device as recited in claim 2, wherein an inboard surface of said outboard face plate of said rotator is dimensioned and configured to lean against an outboard surface of said radially inner engagement portion of said stator to form a barrier against contaminants.

* * * * *